Martin D. Hoza
Albert J. Meyer
William S. Smith
INVENTORS

BY C. M. Kucera

ATTORNEY

Martin D. Hoza
Albert J. Meyer
William S. Smith
INVENTORS

BY C. M. Kucera

ATTORNEY

Martin D. Hoza
Albert J. Meyer
William S. Smith
INVENTORS

BY C. M. Kucera

ATTORNEY

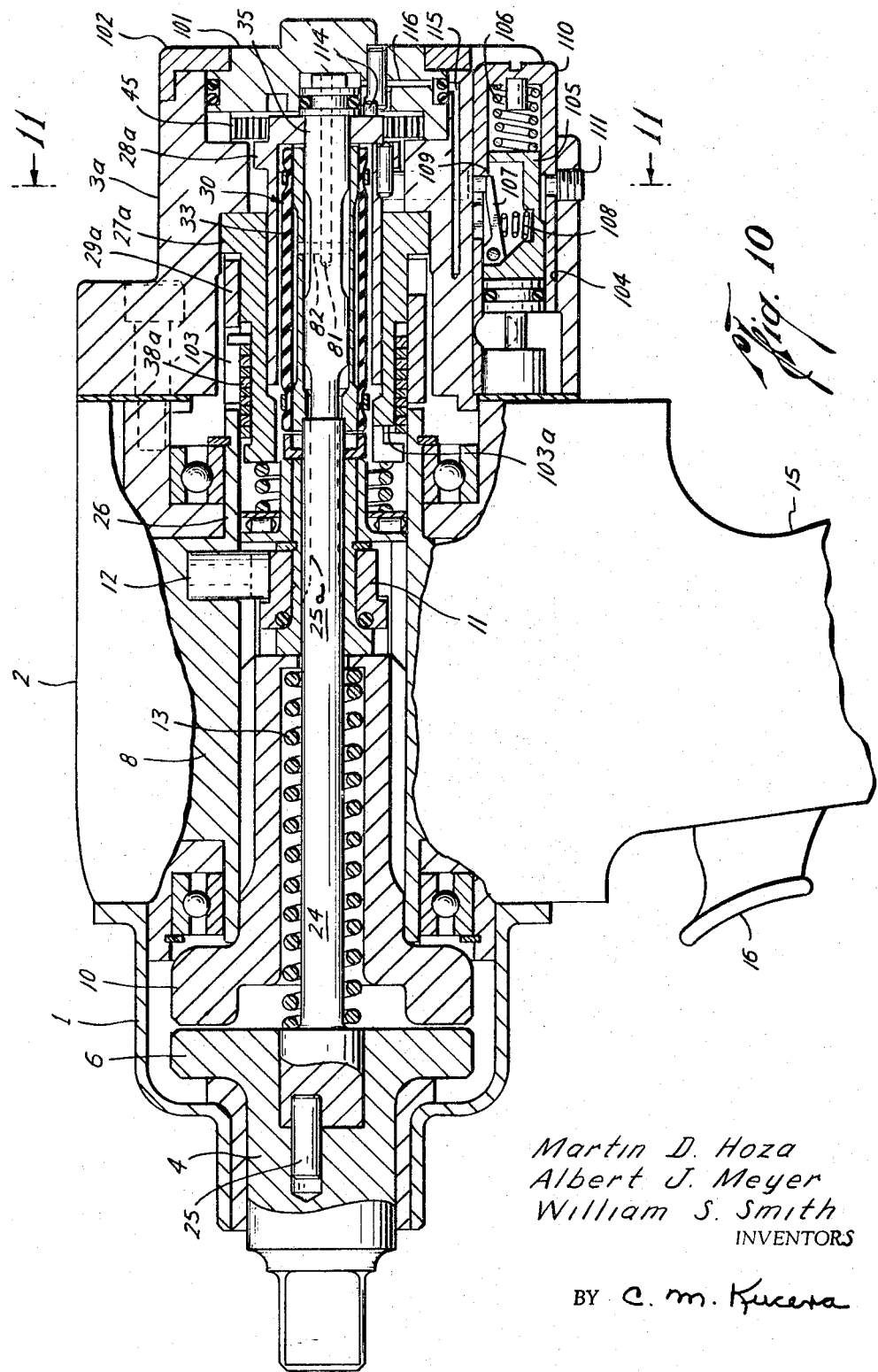

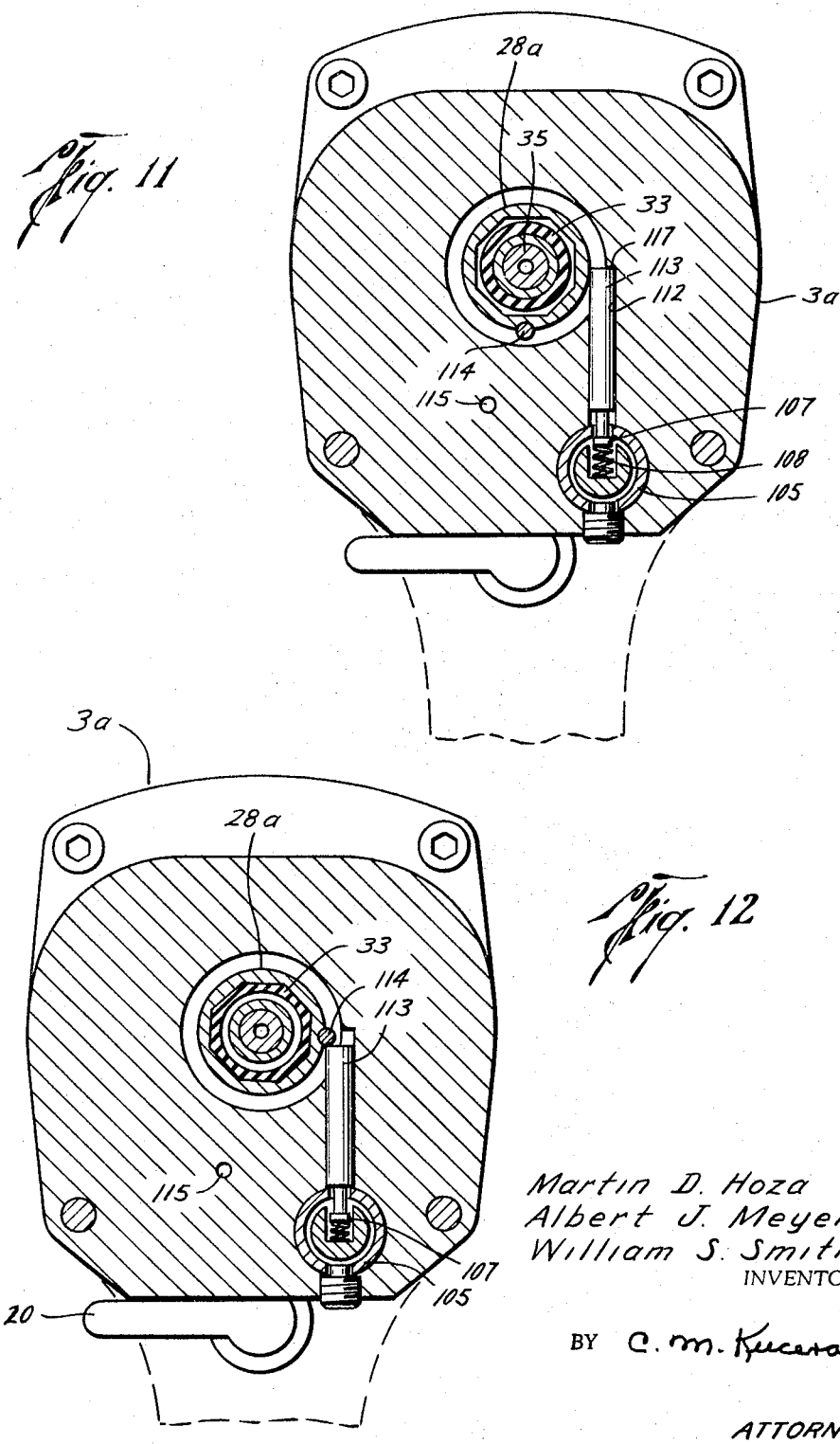

United States Patent Office 3,318,390
Patented May 9, 1967

3,318,390
MECHANISM FOR CONTROLLING TENSION
IN FASTENERS
Martin D. Hoza, Albert J. Meyer, and William S. Smith, all of Houston, Tex., assignors to Reed Roller Bit Company, Houston, Tex., a corporation of Texas
Filed Oct. 28, 1964, Ser. No. 407,061
16 Claims. (Cl. 173—12)

This invention relates to a mechanism for controlling tension in fasteners and may be used, for example, in power operated impact wrenches for driving threaded fasteners such as nuts, bolts, fittings, or the like.

A general object of the invention is the provision of a new and improved tension control for an impact wrench which automatically shuts off the power supply to the wrench upon attainment of a predetermined rotation of the threaded fastener.

Another object of the invention is to provide a new and improved control mechanism for an impact wrench, which will provide more uniform tension and clamping force in threaded fasteners, and which is easy to adjust and operate.

Another object is to provide a new and improved adjustable mechanism for an impact wrench which will provide a more uniform tension in a threaded fastener, notwithstanding variations caused by friction, lubrication, or by irregular or damaged threads of the fastener or by fluctuations in the power supply to the tool.

Another object is to provide a new and improved adjustable control mechanism for an impact wrench which will run up a threaded fastener to some predetermined initial torque and thereafter provide a predetermined additional rotation of the fastener, and then automatically shut off the power supply to the tool; and when the tool is removed from the work, the mechanism will automatically reset itself for the next similar operation.

Another object is to provide a new and improved adjustable control mechanism for an impact wrench whereby upon a predetermined resistance to rotation of the workpiece, the rebound of a striking means actuates a control mechanism which travels with the workpiece a predetermined number of degrees of rotation and then shuts off the power supply to the tool and which tool, when removed from the workpiece, automatically resets itself for the next similar operation.

Another object is to provide a new and improved control mechanism for an impact wrench which permits running down and impacting a fastener to a snug position of some predetermined torque. After this initial torque is reached, the rebounding of the striking means actuates a clutch control means whereby an additional preselected rotation of the fastener is permitted. This is known as the "turn-of-the-nut" method. When this additional rotation has been accomplished, the control means automatically shuts off the power supply to the tool. When the tool is then removed from the work, the control means automatically resets itself for the next similar operation.

Another object of the invention is to provide a new and improved control means for impact wrench whereby a preselected initial torque range may be attained for a workpiece, after which the final tightening of the workpiece may be selected from zero to approximately 360 degrees of rotation or more.

A specific object of the invention is to provide a new and improved elastic pressure fluid operated impact wrench having a control mechanism comprising an elastic clutch means set in motion by a predetermined rebound of the striking member of the impact mechanism whereby a workpiece is thereafter tightened a given number of degrees of rotation, and having means effective in response to said angular movement to shut off the power supply to said tool, and means to reset the control means when the tool is removed from the workpiece so that another similar operation may be repeated.

Another object of the invention is to provide an impact wrench having a control mechanism which permits a "turn-of-the-nut" method for a predetermined number of degrees of rotation of a workpiece in a forward direction and which wrench will deliver full power in a reverse direction.

Other objects will become apparent from the following description and accompanying drawings in which:

FIGURE 10 is a longitudinal sectional view of another embodiment of the invention.

FIGURE 11 is a sectional view taken along line 11—11 in FIGURE 10 showing a valve sear in locked position.

FIGURE 12 is a view similar to FIGURE 11, but showing the valve sear tripped.

Figure 1:
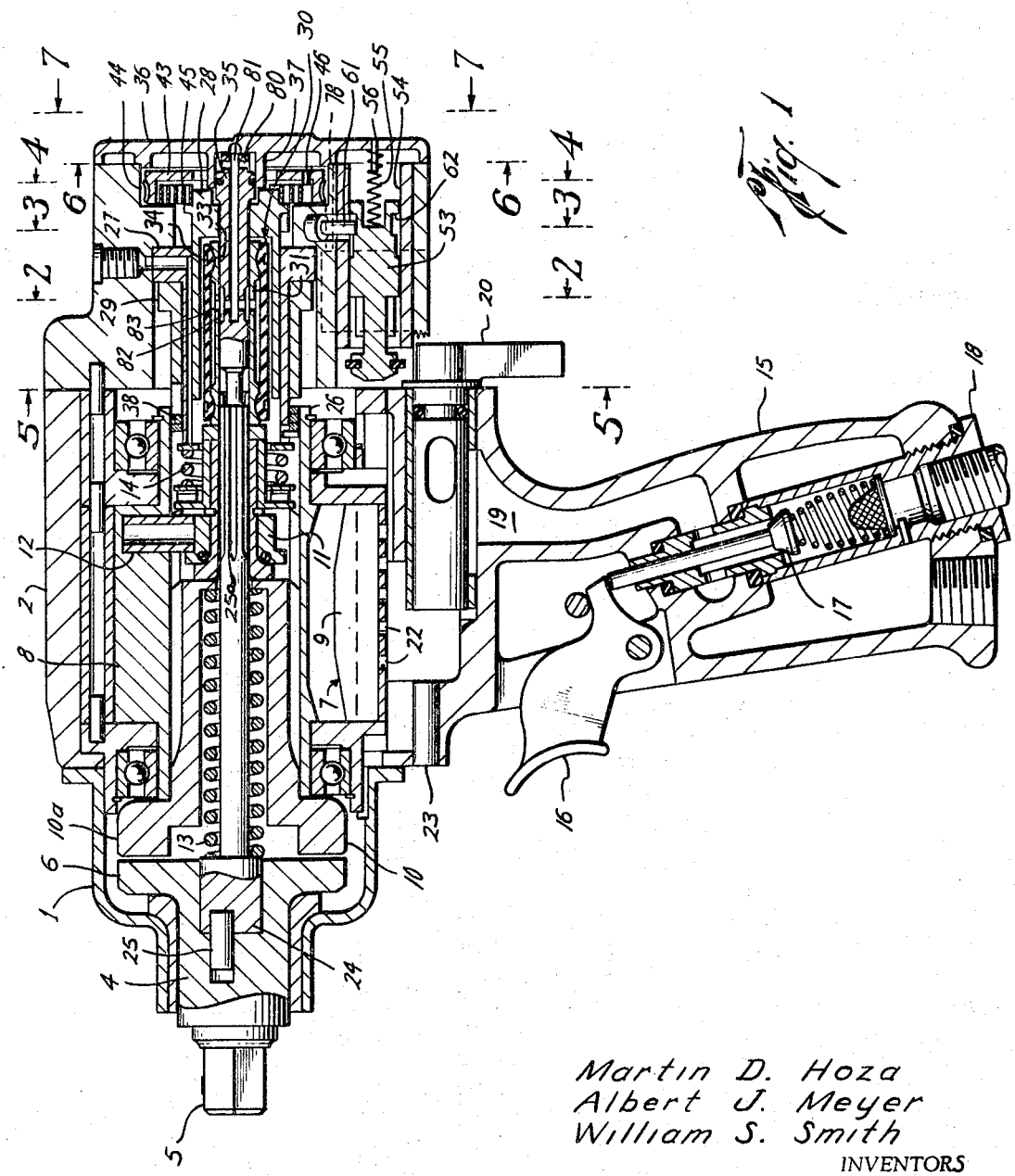
FIGURE 1 is a longitudinal sectional view of one embodiment of the invention.

Referring to FIGURE 1, the tool is shown comprising a forward housing 1, a central housing 2, and a rear control housing 3. Within the forward housing 1 is an anvil 4 which is rotatably secured within a suitable bearing. The forward end 5 of the anvil 4 comprises a square drive for attachment to a drive socket or the like, for attachment to a workpiece. The anvil 4 has driven lugs 6 thereon. The central housing 2 has a vane-type, air motor 7 comprising a rotor 8 and vanes 9. A hammer 10 is splined within the rotor 8 and is rotatably carried thereby and is driven by such splines which permit the hammer to reciprocate within the rotor 8. A cam assembly 11 is located in proximity to the rear end of the hammer 10. The hammer 10 has driving lugs 10a on the forward end thereof. A cam roller 12 is mounted in the rotor 8 for rotation therewith. The cam roller 12 is adapted to engage with the cam assembly 11 to rotate the same, and the cam assembly 11 is adapted to be urged forward by the cam roller 12 to cause the hammer 10 to move forward to effect rotational impact of the driving lugs 10a upon the driven lugs 6 of the anvil 4, under certain conditions of tool operation. After such impact, a spring 13 returns the hammer 10 to the position shown in FIGURE 1. The motor 7 is mounted on suitable bearings, and a thrust spring 14 is provided to take up end play of the motor.

The central housing 2 has a dependent handle 15 which has a trigger 16 to actuate an inlet valve 17. The handle 15 has a threaded connection 18 for connection to a suitable elastic pressure fluid source (not shown).

Figure 5:
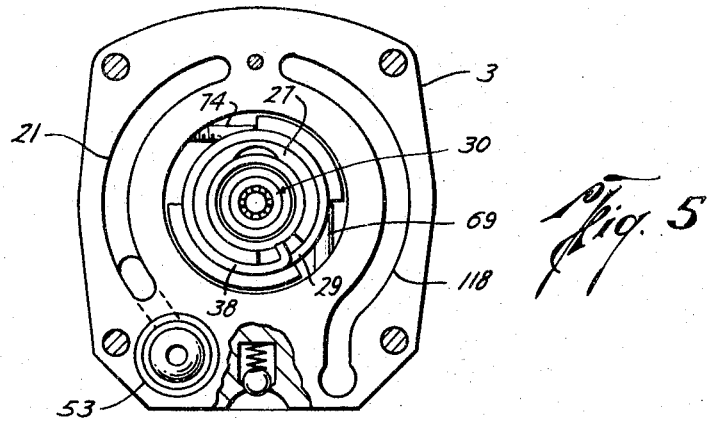
FIGURE 5 is a view taken along line 5—5 in FIGURE 1.

Upon depressing the trigger 16, the valve 17 is opened whereby pressure fluid may enter the passageway 19 and thence be conducted through the reversing valve 20, which if set for forward rotation of the tool, allows the pressure air to enter the passageway 21 (see FIGURE 5) and thence to the motor 7 whereupon air is exhausted through ports 22 and thence out of ports 23.

A shaft 24 extends from the anvil 4 rearwardly through the hammer and motor and through the cam assembly 11, to which it is connected so that there is some limited rotational movement of the cam assembly 11 with respect to the shaft 24 for a "lost motion" connection therewith. The shaft 24 is secured to the anvil 4 by a pin 25 and the shaft 24 rotates in unison with the anvil 4. The rear end of the shaft 24 is splined, as shown at 25a. The rotor 8 has a rearwardly extending cylindrical portion 26.

The rear housing 3 has a clutch cylinder 27 which is non-rotatably secured within such housing. A valve actuator 28 is disposed within the clutch cylinder 27 and is arranged for relative limited rotation with respect thereto. A clutch sleeve 29 is mounted on the clutch cylinder 27 and is arranged for limited rotation with respect thereto. An inflatable clutch assembly 30 is provided and includes an inner sleeve 31, the forward end of which is splined to the rear splined portion 25a of the shaft 24 and rotates with such shaft. A resilient sleeve 33 is provided substantially co-extensive with the sleeve 31 and is secured thereto by means of rings 34 to provide for an air-tight seal between the ends of the elastic sleeve 33 and the sleeve 31. A clutch spindle 35 is mounted within the sleeve 31 and abuts the end of the shaft 24. The rear end of the spindle 35 extends to a back plate 36 and is sealingly secured within a cylindrical box 37.

Figure 8:
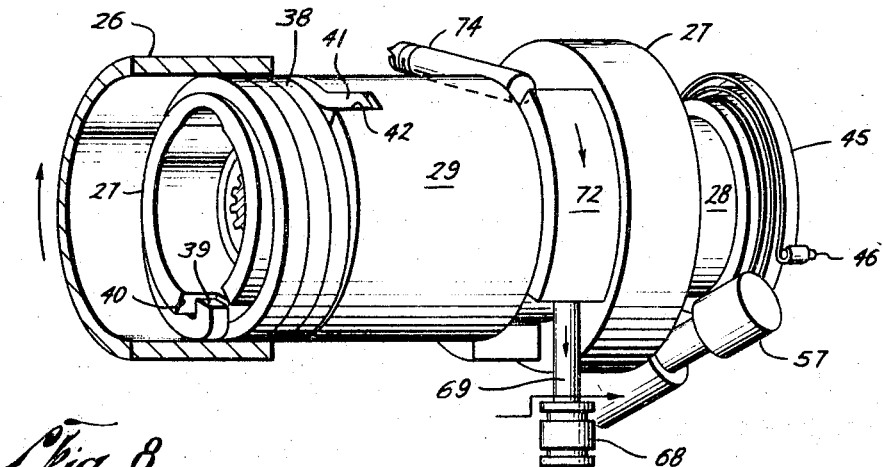
FIGURE 8 is an isometric view (partly schematic) of clutch parts in a position to open the valve to engage the clutch control means.
Figure 9:
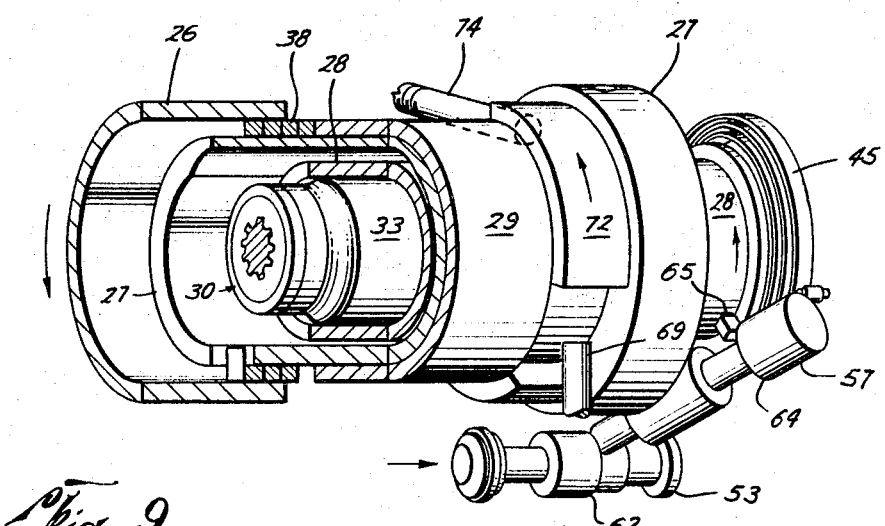
FIGURE 9 is an isometric view (partly schematic) of some of the clutch parts traveling through a given arc after engagement of the clutch.

A clutch spring 38 is mounted within the rear extension 26 of the rotor 8. The forward end of the clutch spring, which is wound to the right, has a radially inwardly extending tang 39 which engages within a lost motion slot 40 of the non-rotatable clutch cylinder 27. The other end of the clutch spring 38 has an axially extending tang 41 which extends into a slot 42 of the clutch sleeve 29 (see FIGURES 8 and 9). An adjusting ring 43 is secured within a counterbore 44 of the housing 3. A clock spring 45 is disposed within the adjusting ring 43 and one end of the clock spring 45 is secured to the adjusting ring 43 by means of pin roll pin 46. The other end of the spring is secured within the slot 47 of the valve actuator 28 (see FIGURE 4). The valve actautor 28 has a stop pin 48 extending rearwardly thereof which is adapted to engage with projection 43a of the adjusting ring 43, see FIGURE 7. The clock spring 45 is pre-loaded to cause the valve actuator 28 to be biased in a counter-clockwise direction so that the pin 48 will initially rest on the projection 43a.

Figure 4:
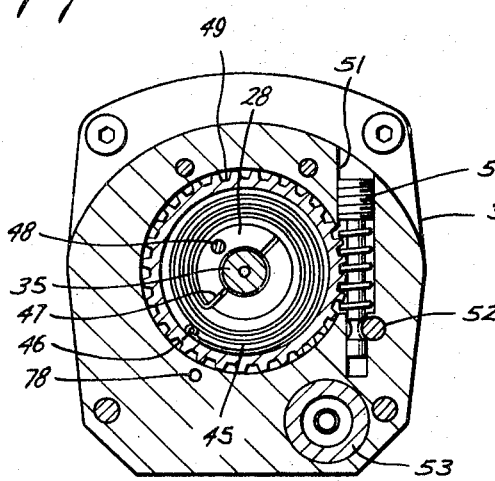
FIGURE 4 is a sectional view taken along line 4—4 in FIGURE 1.

As can be seen in FIGURE 4, the adjusting ring 43 has a worm gear 49 cut into its outer periphery. A worm screw 50 is disposed within an opening 51 of the housing 3 and is secured axially by pin 52. The worm screw 50 may be actuated by means of an internal wrench or the like to rotate the ring 43 to various angular settings.

Referring again to FIGURE 1, a valve 53 is disposed within a bore 54 of the housing 3. The valve 53 is held normally open by means of spring 55 which extends between the rear end of said valve and is positioned on the backhead 36 by means of a roll pin 56.

Figure 3:
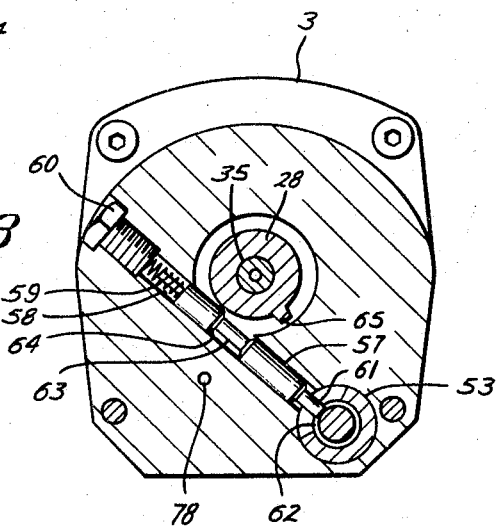
FIGURE 3 is a sectional view taken along line 3—3 in FIGURE 1.

A sear pin 57 is installed within a bore 58 in the housing 3, as can be seen in FIGURE 3. The sear pin 57 is urged toward the valve 53 by means of a compression spring 59 which is held in place by means of a cap screw 60. The end 61 of the sear pin 57 engages a shoulder 62 of the valve 53. The sear pin 57 is undercut as shown at 63 to provide an annular shoulder 64. The valve actuator 28 has a dog 65 thereon which is adapted to engage with the shoulder 64 under certain conditions of tool operation.

Figure 2:
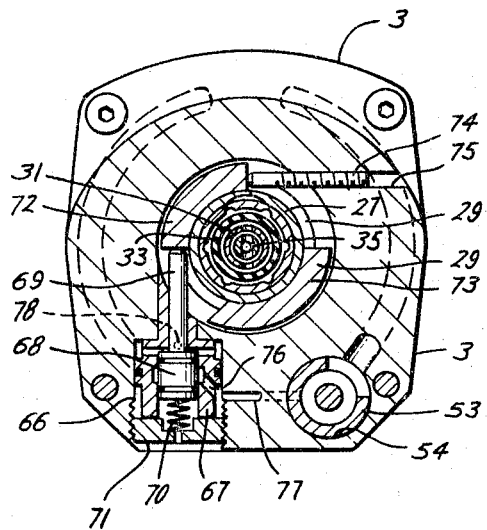
FIGURE 2 is a view taken along line 2—2 in FIGURE 1.
Figure 6:
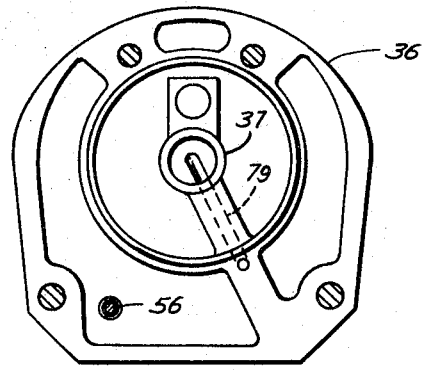
FIGURE 6 is a view taken along line 6—6 in FIGURE 1.

Referring to FIGURE 2, the rear housing 3 is shown having a bore 66 into which a valve chest 67 is disposed. A valve 68 is disposed within said valve chest 67 and has an extension 69 extending upwardly thereof. The valve 68 is in a sliding and sealing engagement within the valve chest 67, and a spring 70 is disposed between the lower end of the valve and a retaining cap 71 to hold the valve normally in the upward position as shown in FIGURE 2. The clutch sleeve 29 has an upper lug 72 and a lower lug 73. An adjusting pin 74 is threadedly engaged within a bore 75 of the housing 3. As can be seen, the adjusting pin 74 is adapted to engage one side of the lug 72 and the upper pin portion 69 of the valve 68 is adapted to engage the other side of the lug 72. The valve chest 67 has an opening 76 therethrough which communicates with a passageway 77 which extends to the bore 54 of the valve 53. The housing 3 has an axially extending passageway 78 which extends to the backhead 36. Referring to FIGURE 6, the axially extending passageway 78 communicates with a passageway 79 in the backhead 36. The passageway 79 extends to the rear portion of the clutch spindle 35. The clutch spindle 35 has passageways 80, 81, and 82 which may conduct pressure fluid to the interior of the sleeve 31. The sleeve 31 has openings 83 therethrough which communicate with the interior of the elastic or resilient sleeve 33.

The operation of the tool is as follows: when it is desired to tighten a threaded fastener such as a nut or a bolt, the trigger 16 is depressed, thus allowing compressed air, for instance, to flow through the valve 17 and into the passageway 19 and through reversing valve 20 and through passageway 21 to effect clockwise rotation of the tool. As the motor 7 rotates, the rotor 8 carries the cam roller 12 along with it and the cam roller 12 engages the cam assembly 11, which cam assembly is attached to the shaft 24 for rotation therewith. The shaft 24 is pinned to the anvil 4 by means of pin 25 so that as the motor rotates, the anvil 4 and consequently the workpiece rotate in unison with the motor 7. When a predetermined resistance to rotation of the workpiece is encountered, the anvil 4, being attached to the workpiece through the drive 5 and a socket (not shown) in the usual manner, slows down. The motor 7 will continue to drive the cam roller 12 whereupon it rolls over a lobe on the cam assembly 11 causing the hammer 10 to move forward and effect engagement of the driving lugs 10a and driven lugs 6 of the anvil 4 to impart a rotative impact thereto. As the hammer impacts the anvil, it will rebound rearwardly from the driven lugs 6, and the spring 13 will cause the hammer to return to the position shown in FIGURE 1. The clutch spring 38 which is wound to the right and disposed within the rear rotor extension 26 will slip with respect to the rear extension 26 since the rearward end of the spring is constrained from free rotation, being secured by the tang 41 which is disposed in the slot 42 of the clutch sleeve 29 which has but limited rotation with respect to the motor.

As the hammer rebounds, the rotor 8 also rebounds as does the rear extension 26 of the rotor 8. As the rotor 8 rebounds, the clutch spring 38 travels with the rear extension 26 acting as a one-way clutch and through the tang 41 carries the clutch sleeve 29 in a rearward or counter-clockwise direction. The lug 72 which is on the rear portion of the sleeve 29 thus, upon such rebound, engages the stem 69 of the valve 68. When such rebound reaches a predetermined travel, the lug 72 will urge the valve 68 downwardly sufficiently to permit the pressure air in passageway 77 to flow through passageway 76 whereupon the air pressure will keep the valve 68 in a downward position, thus exposing the passageway 78 to the pressure air. The passageway 78 communicates with the passageway 79 which in turn communicates with the passageways 80, 81, 82, and 83 of the spindle 35 and the sleeve 31 thus allowing such pressure fluid to expand the resilient clutch tube 33 of the clutch assembly 30. As the resilient clutch tube 33 expands, it frictionally engages within the interior of the valve actuator 28. Since the clutch assembly 30 is splined to the shaft 24 by means of splines 25a, the inflation of the clutch assembly 30 engaging the valve actuator 28 will now cause the valve actuator 28 to turn with the shaft 24 which shaft turns with anvil 4. Thus, as the workpiece is tightened, the anvil 4 and the shaft 24 and the clutch assembly 30 and the valve actuator 28 rotate in unison. As the workpiece continues to rotate, the valve actuator 28 rotates a predetermined number of degrees whereupon the dog 65 on the valve actuator 28 will engage shoulder 64 of the sear pin 57 and lift it from the shoulder 62 of the valve 53, see FIGURE 3. When the sear pin 57 is so tripped, the valve 53 will be closed by air pressure in the tool which overcomes the bias of the spring 55, thus shutting off the tool. As the trigger 16 is released, the pressure air which has inflated the clutch assembly 30 is allowed to return to atmospheric pressure whereupon the clutch assembly 30 will disengage itself from the valve actuator 28 thus allowing the clock spring 45 to rotate the valve actuator counter-clockwise until the stop pin 48 on the actuator 28 engages the projection 43a of the adjusting ring 43.

As adjusting ring 43 may initially be adjusted by means of worm 50 to position the stop pin 48 and the projection 43a so that the varying amounts of rotational travel may be effected after the inflatable clutch assembly 30 is actuated, as just described. Thus it will be apparent that the farther counter-clockwise the actuator 28 and its dog 65 are positioned before the inflatable clutch is engaged, the farther clockwise it will have to travel before the dog 65 trips the sear pin 57.

In the tool shown, the range of angular travel of the control mechanism after actuation of the inflatable clutch is from zero to approximately 300 degrees. It is apparent that if more than a 360 degree travel is desired before the sear pin 57 is to be tripped, a spiral groove arrangement of the stop pin 48 in the adjusting ring 43 may be utilized.

Figure 7:
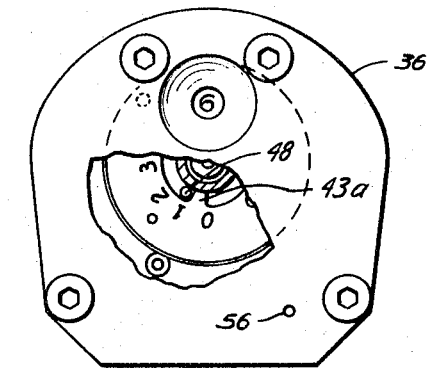
FIGURE 7 is a view taken along line 7—7 in FIGURE 1 showing the backhead (partially removed) of the tool showing an aperture for reading the travel adjustment for the control device.

Referring to FIGURE 2, depending upon the degree of initial snugness desired before the rebound of the impact mechanism actuates the inflatable clutch as just described, the adjusting screw 74 may be screwed in or out as desired to allow a given travel in rebound of the lug 72 before it trips the valve 68. The predetermined torque to which the threaded fastener is set may be determined by sound or may be determined empirically and after such a snug or predetermined torque of the workpiece has been determined, it may then be determined empirically how much farther the workpiece is to be turned after such snugness or predetermined torque has been achieved. If it is decided for instance to have the threaded workpiece advance 180 degrees after the initial snugness or predetermined torque has been achieved, then the adjusting ring 43 is set by the worm screw 50 to turn 180 degrees after the rebound of the mechanism actuates the valve 68 to actuate the inflatable clutch assembly 30. In the embodiment shown, the numerals which may be seen in FIGURE 7 are graduated in approximately 30 degree increments. Thus the tool set on the numeral "6" will allow the control mechanism to turn with the anvil approximately 180 degrees after a predetermined torque has been reached and the inflatable clutch assembly 30 has been engaged.

By way of further description, the tool of the invention as shown operates as a regular impact wrench until a predetermined resistance to rotation of the workpiece is encountered, whereupon means responsive to the rebound of the impacting mechanism sets in motion means to premit the workpiece to be rotated additionally only a certain number of degrees from such predetermined snugness to final tightness, which number of degrees is controlled by the setting of the adjusting ring 43. After this predetermined number of degrees rotation has been attained, the tool automatically shuts itself off. After the tool is removed from the work to perform another similar operation, the trigger 16 is released whereupon the pressure air in the tool is reduced to atmospheric. When this happens, the clutch assembly 30 disengages itself from the valve actuator 28, whereupon the clock spring 45 returns the valve actuator counter-clockwise until the stop 48 comes to rest on the projection 43a of the adjusting ring 43.

The means shown herein to set in motion the mechanism which controls the turn of the nut after initial torque has been reached is directly responsive to the rebound of the impacting mechanism; it will be apparent that various devices responsive to torque may be utilized to set in motion means whereby a predetermined number of degrees rotation of the workpiece is achieved after attaining a predetermined initial torque. For example, an inertia wheel could be mounted on a cam on the back of the impact mechanism whereby the inertia wheel would move axially on the cam after a predetermined initial torque had been achieved, and such axial motion of said inertia wheel could trip the valve 68 or actuate other means to connect the control means to the workpiece through the shaft 24 and the anvil 4.

It will be apparent that after the pressure fluid in the tool has been reduced to atmospheric and the clock spring 45 has rotated counter-clockwise the valve actuator 28 and with it the dog 65, the spring 70 will return the valve 68 to the position shown in FIGURE 2, and the spring 59 will return the sear pin to the position shown in FIGURE 3. At the same time, the spring 55 will return the valve 53 to the position shown in FIGURE 1, thereby resetting the tool for an operational sequence such as that just described.

Referring to FIGURES 10, 11, and 12, another embodiment of the invention is shown, which embodiment is generally similar to and operates in a manner similar to that just described. The chief difference in the embodiment shown in FIGURES 10–12 is in the shutoff valve means. This embodiment has a rear housing 3a, having an adjustment knob 101 which is secured to the housing by means of a back plate 102. Installed within the housing 3a is a stationary clutch cylinder 27a. A clutch spring 38a is disposed within the rear cylindrical portion 26 of the rotor 8. A clutch sleeve 29a is disposed on the clutch cylinder 27a and over a portion of the clutch spring 38a. The clutch sleeve 29a is slotted as shown at 103. The forward portion of the spring 38a is secured within a slot 103a of the clutch cylinder 27a. The rear portion of the spring 38a is secured within the slot 103 of the clutch sleeve 29a. A valve actuator 28a is disposed for limited rotational movement within the cylinder 27a.

Disposed within a bore 104 of the housing 3a is a valve assembly 105. The valve assembly 105 is urged to position shown in FIGURE 10 by means of spring 106. The valve assembly has a pivoted sear 107 which is urged to position shown in FIGURE 10 by spring 108. The sear 107 engages a shoulder 109 of a valve sleeve 110. The valve 105 is positioned and secured in place by means of a set screw 111.

As shown in FIGURES 11 and 12, housing 3a has a bore 112 into which is disposed a trip pin 113. The rear end of the valve actuator 28a has an actuating pin 114. In the setting shown, the knob 101 is rotated counter-clockwise until the pin is in the position shown in FIGURE 11, which setting is for approximately 270 degrees rotation after the clutch mechanism has been actuated by a predetermined torque achievement of the threaded fastener.

After the predetermined torque has been attained, the trip valve 68 is opened by a lug on the clutch sleeve 29a whereupon pressure air will be admitted to passageways 115 and 116 to the interior of the inflatable clutch assembly 30 through the spindle 35 in a manner similar to that previously described, whereupon as the clutch assembly turns, the stop pin 114 will engage the end 117 of the trip pin 113 and move the pivoted sear 107 downwardly out of engagement with shoulder 109 (see FIGURE 12) whereupon the air pressure in the tool will move the valve 105 to the right, overcoming the bias of the spring 106 to shut off air pressure to the tool. The trigger 16 is then released, and the tool is removed from the work, whereupon the presusre fluid in the tool will be reduced to atmospheric; thereupon, the clock spring 45 will return the valve actuator 28a and the trip pin 114 carried thereby to the position shown in FIGURE 11. Also, the springs 106 and 108 will return the valve 105 and the sear 107 respectively to the positions shown in FIGURE 10 whereby the sear 107 will again engage with the shoulder 109 of the valve sleeve 110.

When either of the tools is operated in reverse or counterclockwise, such as in removing the nut or the like, it is usually not desired that the clutch control be operative. Thus, when the reversing valve 20 is set for reversing position, the passageways 78 and 79 of the first embodiment described and the passageways 115 and 116 of the second embodiment described are not exposed to pressure fluid. When set in a reverse position, the air passageway 118 is exposed to the pressure fluid to operate the motor in a reverse or counter-clockwise direction, see FIGURE 5. Thus, the clutch assembly 30 is rendered inoperative in a reverse direction. When operating in a reverse direction, the forward end of the clutch spring 38 engages within the slot 40 by means of the tank 39. The slot 40 is in the stationary clutch cylinder 27. Thus the spring 38 is constrained from free rotation in a counter-clockwise direction, and since it is a right-hand wound spring, the rear rotor extension 26 will slip upon the spring 38.

Thus, it will be apparent that clockwise operation of the tool of the invention provides for a run-up and impacting of the workpiece to a predetermined torque and upon reaching such predetermined torque, a mechanism is set in motion whereby the workpiece may be turned additionally a given number of degrees whereupon the tool is shut off automatically. As the tool is removed from the work for the next similar operation, the clutch mechanism will reset itself to its initial position. When it is desired to use the tool to loosen a nut or the like, the impacting mechanism of the tool will be operative to losen such a fastener; but the clutch mechanism, used to control the degree of turn of the nut when the tool is being operated in a clockwise direction, will be rendered inoperative when the tool is operated in a counter-clockwise direction.

The invention is not limited to the embodiments shown. Various changes within the scope of the following claims will occur to those skilled in the art.

What is claimed is:

1. A pneumatically powered impact tool for driving threaded fasteners comprising a rotatable anvil adapted to be connected to a workpiece, a motor, a rotatable hammer driven by said motor, a cam rotatably connected to said anvil, a cam actuator driven by said motor, resilient means biasing the anvil and hammer apart, the said cam actuator adapted to rotate the cam and anvil and upon a predetermined resistance to rotation of the anvil, move the cam and hammer toward the anvil against the bias of said resilient means to cause the hammer to deliver a series of rotational impacts to said anvil, the said resilient means serving to move the hammer out of engagement with the anvil after such impacts, control means comprising a pneumatic clutch, an actuating valve and a shut-off valve, connecting means extending from said anvil to said clutch, means responsive to a predetermined degree of rebound of said hammer to open said actuating valve to energize said clutch to cause said clutch to engage said connecting means and rotate in unison with said anvil, trip means carried with said clutch and arranged to trip said shut-off valve when the anvil has rotated a predetermined number of degrees after said clutch has been energized.

2. An impact tool according to claim 1, wherein the means responsive to said predetermined degree of remound of the hammer is adjustable.

3. An impact tool according to claim 1, including means to render said pneumatic clutch inoperative when the tool is operated in a reverse direction of rotation.

4. An impact tool according to claim 1, including means to preselect the number of degrees the clutch will rotate with said anvil.

5. An impact tool according to claim 1, including automatic means to reset the actuating valve, the shut-off valve and the clutch when the tool is removed from the workpiece.

6. A pneumatically powered impact tool for driving threaded fasteners comprising a motor, rotatable impact receiving means adapted to be connected to a workpiece, impact delivering means adapted to deliver a series of rotational impacts to said impact receiving means, clutch means operatively associated with said impact receiving means for periodic relative and conjoint rotational movement therewith, an actuating valve and a shut-off valve, means responsive to a predetermined resistance to rotation of said impact receiving means to open said actuating valve to actuate said clutch to effect conjoint rotational movement thereof with said impact receiving means, trip means carried by said clutch means and arranged to trip said shut-off valve when the impact receiving means has rotated a predetermined number of degrees after said clutch has been actuated.

7. An impact tool according to claim 6, including means to render the clutch inoperative when the tool is operated in a reverse direction.

8. A power operated tool having an impact mechanism for driving a threaded fastener including automatic control means to permit the impact mechanism to effect an initial predetermined torque of the fastener and a further means actuated by said control means to control the final tightening of the fastener by automatically limiting the number of degrees the impact mechanism is permitted to turn the fastener.

9. A power operated tool according to claim 8, including means to preselect the number of degrees the impact mechanism turns the fastener for final tightening.

10. A power operated tool having an impact mechanism for driving a threaded fastener including automatic control means to permit the impact mechanism to effect an initial predetermined torque of the fastener and a second means actuated by said control means to control the final tightening of the fastener by automatically shutting off the power supply to the tool after the fastener has been rotated a predetermined number of degrees.

11. A power operated tool for driving a threaded fastener including means effective in response to a predetermined resistance to rotation of the fastener to cause the tool to rotate the fastener a preselected number of degrees, and a further means actuated by said first means effective in response to said angular movement to shut off the power supply to the tool.

12. A power operated tool according to claim 11, wherein the shut-off means responsive to the angular movement of the fastener is adjustable.

13. A tool for driving a threaded fastener comprising a motor, a power supply for said motor, an impact mechanism including a rotatable anvil adapted to be connected to the fastener, a rotatable striking means driven by said motor and arranged to deliver a series of rotational impacts to said anvil, control means set in motion in response to a predetermined resistance to rotation of said anvil to permit the tool to turn the anvil a predetermined number of degrees and a further means actuated by said control means to shut off the power supply to the tool.

14. A tool according to claim 13 wherein the control means set in motion in response to a predetermined resistance to rotation of the anvil includes adjustable means.

15. A power operated tool for driving a threaded fastener including automatic control means to permit the tool to tighten the fastener to an initial preselected torque and a further means actuated by said control means to permit the tool to turn the fastener a preselected number of degrees to supply a final torque to said fastener.

16. Automatic controls for a power operated tool having a motor and a spindle rotated thereby with the spindle adapted to be connected to a fastener comprising a first means to control the flow of energy to said motor, a second means permitting the rotation of the spindle to tighten the fastener to an initial preselected torque and a third means actuated by said second means controlling the rotation of the spindle to tighten the fastener to a preselected degree of final tightness.

References Cited by the Examiner
UNITED STATES PATENTS

| | | | |
|---|---|---|---|
| 2,964,151 | 12/1960 | Eckman | 173—12 |
| 3,023,995 | 3/1962 | Hopkins | 192—88 |
| 3,180,612 | 4/1965 | Spyridakis et al. | 173—12 |
| 3,195,655 | 7/1965 | Karden | 173—12 |
| 3,195,702 | 7/1965 | Alexander | 173—12 |
| 3,212,590 | 10/1965 | Hoza et al. | 173—93 |

FRED C. MATTERN, JR., *Primary Examiner.*

L. P. KESSLER, *Assistant Examiner.*